Aug. 5, 1930.  A. O. HURXTHAL  1,772,423
CONVEYER FOR PLASTIC MATERIALS
Filed Sept. 12, 1928  2 Sheets-Sheet 2

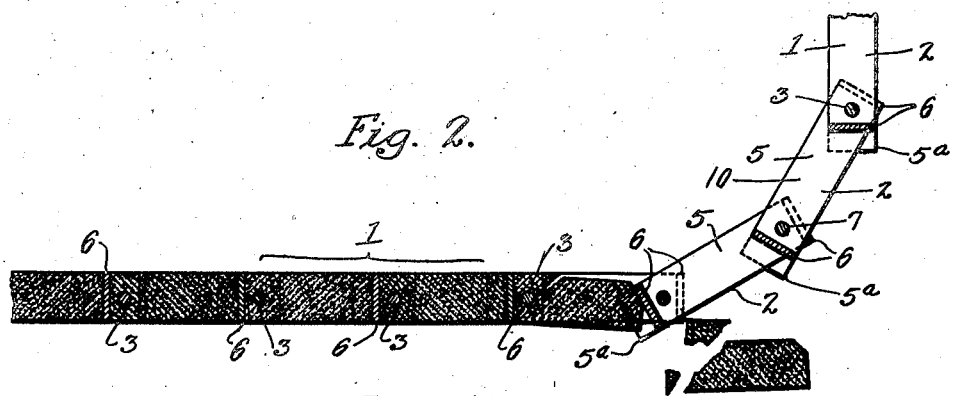
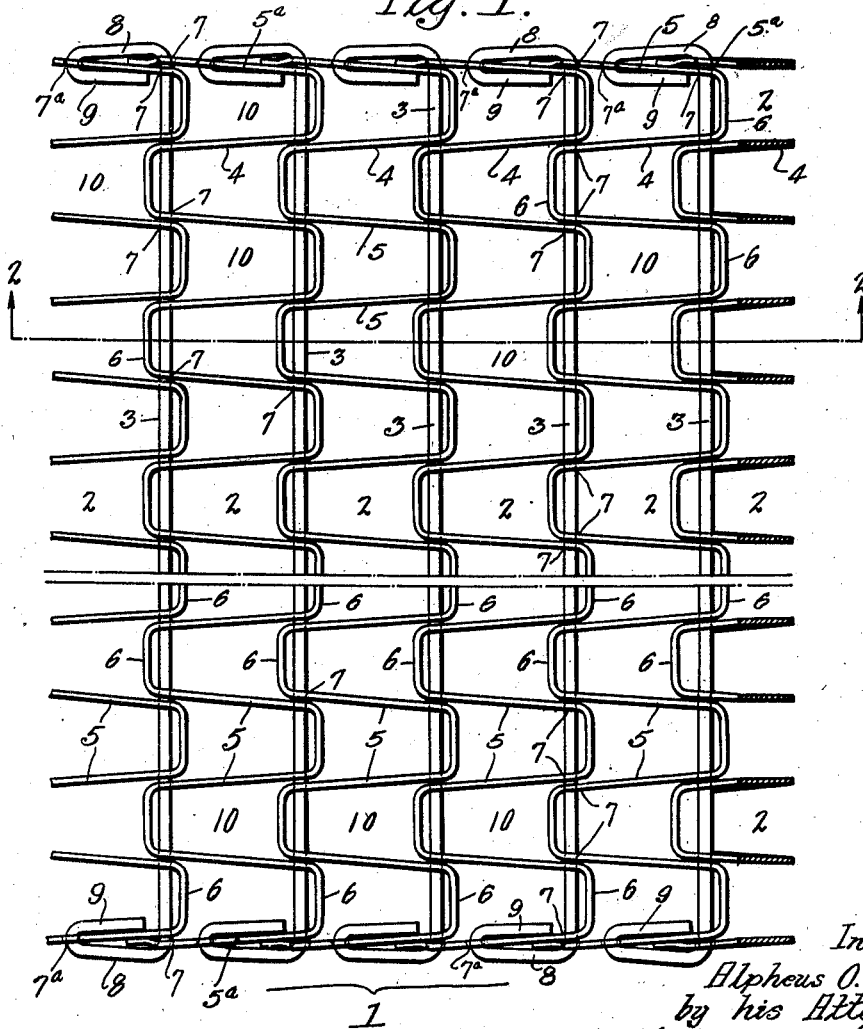

Inventor:—
Alpheus O. Hurxthal
by his Attorneys
Howson & Howson

Patented Aug. 5, 1930

1,772,423

UNITED STATES PATENT OFFICE

ALPHEUS O. HURXTHAL, OF PHILADELPHIA, PENNSYLVANIA, ASSIGNOR TO PROCTOR & SCHWARTZ, INCORPORATED, OF PHILADELPHIA, PENNSYLVANIA, A CORPORATION OF PENNSYLVANIA

CONVEYER FOR PLASTIC MATERIALS

Application filed September 12, 1928. Serial No. 305,589.

This invention relates to reticulated or foraminous conveyers for use in the carrying of plastic materials from place to place, or through suitable apparatus for treatment of one kind or another, the material being finally dicharged or removed from the conveyer.

Various methods and apparatus have been employed for the purpose of placing material, such as paints, pigments, chemicals, etc., while in a plastic state, within the meshes or openings of reticulated or foraminous conveyer belts, and the generally adopted method for removing the material, after it has attained a more or less dry and brittle state, is to beat the conveyer, whereby the material is broken and loosened from the conveyer, from which it then falls or is otherwise removed.

This beating operation, while it effectively removes the material from the conveyer, damages the conveyer to a considerable extent and thereby greatly reduces the period of usefulness of the conveyer. These conveyers are essential equipment in the manufacture and treatment of plastic materials, and, as they are relatively expensive, the cost of replacements forms an important item in the manufacturing and maintenance accounts of the producers of this class of material.

The object of my invention is to produce a reticulated or a foraminous conveyer for plastic materials which will withstand the above mentioned beating and other abuses to which a conveyer of this type is or may be subjected.

Another object of the invention is to construct the conveyer in such a manner that it will be provided with self-contained means for ejecting the material from the conveyer, which, after the plastic material has assumed a more or less dry or brittle state and upon flexing of the conveyer from the normal plane it assumed as the material dried or hardened, will cause all, or at least a greater part of, the material to be removed from the conveyer, thereby making the beating operation either totally or partially unnecessary, depending upon the nature of the material. Elimination of the beating, either totally or partially, will prolong the useful life of the conveyer indefinitely, making the necessity for replacement practically nil.

Referring to the drawings:

Fig. 1 is a face view of a portion of a conveyer made in accordance with the principles of my invention;

Fig. 2 is a sectional elevation taken on the line 2—2 of Fig. 1, showing the plastic material within the conveyer and a portion of the conveyer being flexed to discharge the material;

Figure 3:
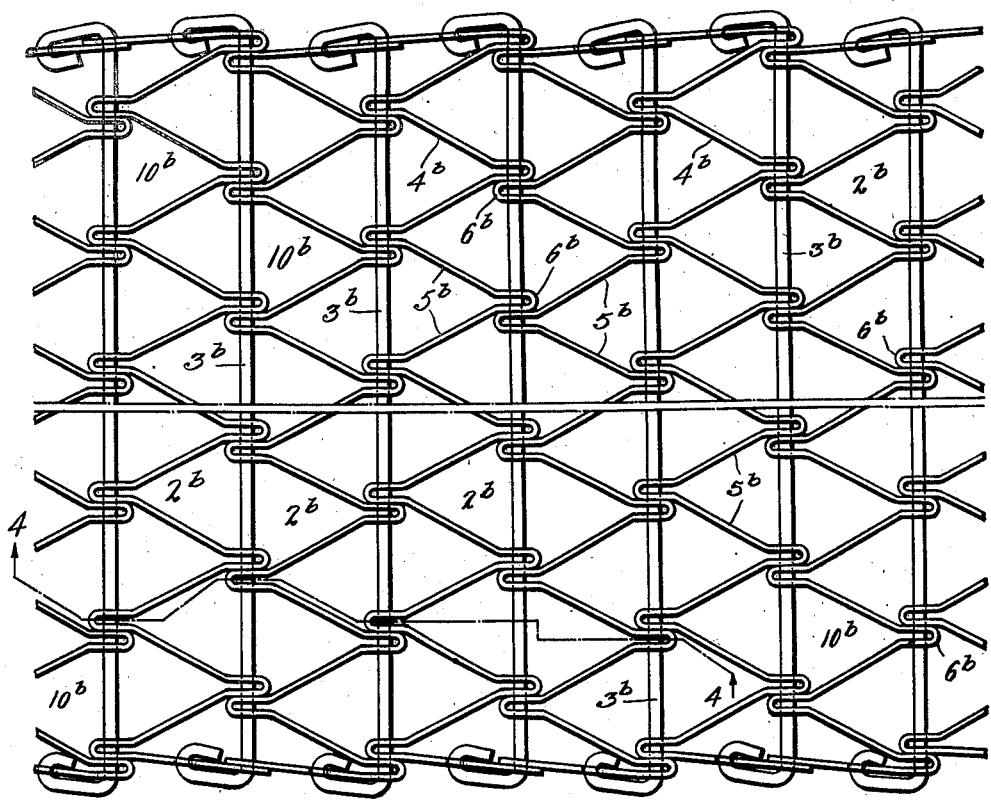
Fig. 3 is a face view of a modified form of construction within the scope of my invention.

Referring particularly to Figs. 1 and 2, the preferred form of the invention comprises a conveyer belt or apron 1 consisting of a plurality of link sections 2 pivotally secured together by means of pintles or rods 3.

Each link section consists of a suitably bent bar 4, of substantially rectangular cross-section. In the present instance, the rectangular cross-section of the bar 4 is shown as being oblong with its sides of the greater dimension disposed substantially at right angles to the general plane of the assembled conveyer. The cross-section of the bar could be in the form of a square without departing from the essential features of the invention.

As shown in Fig. 1, each of the bars 4 comprises a series of undulations and lies within the general planes defined by the opposite substantially parallel faces of the assembled conveyer, the bars 4 each extending in a general direction transversely of the conveyer.

The undulations of each bar are created by bending the bar in a manner to form a series of sections 5 extending substantially longitudinally of the assembled conveyer, and a series of sections 6 extending substantially transversely of the conveyer, the longitudinal sections 5 being joined alternately at their opposite ends with the next adjacent section 5 by one of the transverse sections 6. The free ends of the outside longitudinal sections 5ᵃ at the opposite sides of each link section 2 lie adjacent the connected ends of each of the corresponding edge sections 5ª, of the next adjacent link section 2.

In assembling the link section 2 to form the conveyer 1, the crests of the undulations of one bar 4 extend into the troughs of the undulations of the bar 4 forming the next adjacent link section.

The longitudinal sections 5, 5ª are provided with holes 7, adjacent their opposite ends and adjacent the transverse sections 6, said holes being axially aligned transversely of the conveyer and adapted to receive the pintle rods 3, whereby the link sections 2, 2 are pivotally attached to each other.

For the purpose of securing the pintle rods 3 within the conveyer and also for preventing transverse spreading of the conveyer link sections, the outside sections 5ª of each link section 2 are provided with holes 7ª and the ends of the pintle rods 3 are bent, as at 8, and passed through the holes 7ª and again bent, as at 9, within the conveyer as shown. Obviously the pintle rods may be provided with any suitable form of head outside the sections 5ª to answer the same purpose, in place of bending the ends of the pintle rods 3 as shown.

Assembly of the link sections 2 in the manner shown and described produces a reticulated or foraminous conveyer having a plurality of holes or openings 10 for the reception of the material to be carried, and after the material has become more or less dry and brittle flexing of the belt, in a manner substantially as shown at the right hand end of Fig. 2, will effect movement of the transverse sections 6 from their normal positions, substantially at right angles to the general plane of the assembled conveyer, to a position disposed at angles other than right angles with respect to the said general plane of the conveyer, which will pry the material carried in the openings 10 out of the said openings and cause the material to crack away and be loosened from around the pintle rods 3. By this means the material is ejected by a means contained within the conveyer itself, thereby eliminating the necessity of beating the conveyer.

In some instances, a relatively small portion of the material may adhere to the conveyer, whereupon a light tapping of the conveyer may be resorted to, to remove the adhering particles of the material from the conveyer. However, the rugged construction of the conveyer will withstand a relatively severe beating if called upon to do so without damaging the conveyer.

Figure 4:
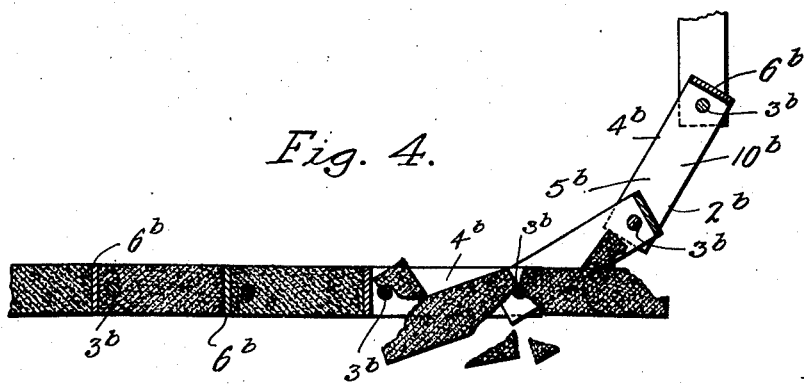
Fig. 4 is a sectional elevation taken on the line 4—4, Fig. 3.

Figs. 3 and 4 illustrate a modified form of conveyer in which the undulated bars 4ᵇ are bent in a substantially zig-zag form, and the sections 5ᵇ while extending in a general direction substantially longitudinally of the conveyer also extend at an angle diagonally disposed with respect to the longitudinal edges of the conveyer, the connecting transversely extending sections 6ᵇ of the bars being reduced in length as compared with the form of the invention shown in Figs. 1 and 2.

In the form of conveyer shown in Figs. 3 and 4, the material carrying openings 10ᵇ extend to each side of the pintle rods 3ᵇ in a direction longitudinally of the conveyer, and as the conveyer is flexed the relative movement of adjacent link sections 2ᵇ around the pintles 3ᵇ will effect a breaking of the cakes around the pintle rods 3ᵇ and also effect the prying action which will effect the ejection or removal of the material from the openings 10ᵇ.

I claim:

1. In a foraminous conveyer for plastic materials, the combination of a plurality of relatively movable link sections co-operatively forming material receiving openings having relatively movable walls adapted to eject the material from the openings when the link sections are relatively moved.

2. In a foraminous conveyer for plastic materials, the combination of a plurality of pivotally connected link sections co-operatively forming material receiving openings extending completely through the conveyer and having relatively movable walls extending substantially perpendicular to the conveyer adapted to eject the material from the openings when the link sections are relatively moved.

3. In a foraminous conveyer for plastic materials, the combination of a plurality of interconnected and relatively movable link sections having material receiving openings formed therein, and means movable with one of said link sections and extending into the opening in another of said link sections for ejecting the material from said openings when the link sections are relatively moved.

4. In a foraminous conveyer for plastic materials, the combination of a plurality of rectangular bars bent respectively into wave-like formations intermeshing along their edges transversely of the conveyer and having flat faces disposed substantially perpendicular to the general plane of the conveyer forming material-receiving openings in the conveyer, and pintles extending transversely of the conveyer through the intermeshing portions of the bars for connecting the same to form the conveyer, said perpendicular walls being adapted to eject the material from the conveyer openings when the wave-like bars are relatively moved about the said pintles.

ALPHEUS O. HURXTHAL.